United States Patent
Kubo et al.

(10) Patent No.: US 7,444,445 B2
(45) Date of Patent: Oct. 28, 2008

(54) SELECTIVELY ADJUSTING SIGNAL COMPENSATION PARAMETERS AND DATA RATE FOR TRANSMISSION OF DATA THROUGH A SMART CABLE

(75) Inventors: Robert A. Kubo, Tucson, AZ (US); Gregg S. Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 11/460,988

(22) Filed: Jul. 30, 2006

(65) Prior Publication Data

US 2008/0028112 A1    Jan. 31, 2008

(51) Int. Cl.
G06F 13/00    (2006.01)

(52) U.S. Cl. .................. 710/104; 710/60; 710/314; 710/72

(58) Field of Classification Search .............. 710/8–12, 710/104–110, 311–317, 300–307, 58–62
See application file for complete search history.

(56) References Cited

U.S. PATENT DOCUMENTS

| 4,311,986 | A | * | 1/1982 | Yee | ............... | 340/825.63 |
|---|---|---|---|---|---|---|
| 5,436,593 | A | * | 7/1995 | Fiori, Jr. | ............... | 330/69 |
| 5,764,695 | A | | 6/1998 | Nagaraj et al. | | |
| 6,237,048 | B1 | * | 5/2001 | Allen et al. | ............... | 710/8 |
| 6,265,951 | B1 | | 7/2001 | Kirshtein | | |
| 6,576,833 | B2 | * | 6/2003 | Covaro et al. | ............... | 174/359 |
| 6,865,615 | B1 | | 3/2005 | Buckland et al. | | |
| 2004/0025089 | A1 | * | 2/2004 | Haswarey et al. | ............... | 714/42 |
| 2005/0111559 | A1 | | 5/2005 | Mezer | | |
| 2005/0227517 | A1 | | 10/2005 | Chen | | |
| 2006/0025018 | A1 | * | 2/2006 | Dube et al. | ............... | 439/628 |

* cited by examiner

*Primary Examiner*—Raymond N Phan
(74) *Attorney, Agent, or Firm*—Dan Shifrin

(57) ABSTRACT

A data storage domain is provided to determine a set of signal conditioning parameters for data being transmitted over smart cables in a data storage domain between an SAS switch and SAS expanders and among SAS expanders. A first expander interrogates any attached smart cables for cable persistent data and captures in a table the cable persistent data. One or more interfaces of the first expander are operated at a first data rate. The switch collects the captured cable persistent data and, in response, determines a set of signal conditioning parameters for data being transmitted on each attached smart cable. The set of signal conditioning parameters includes a first maximum data rate for each attached smart cable. The signal conditioning parameters are then set for each attached smart cable in accordance with the set of determined signal conditioning parameters, whereby the data storage domain is tuned for optimum signal transmission.

16 Claims, 3 Drawing Sheets

SELECTIVELY ADJUSTING SIGNAL COMPENSATION PARAMETERS AND DATA RATE FOR TRANSMISSION OF DATA THROUGH A SMART CABLE

RELATED APPLICATION DATA

The present application is related to commonly-assigned and co-pending U.S. application Ser. No. 11/381,680, entitled MULTIPLEXING A GROUND SIGNAL ON A HIGH SPEED CABLE INTERFACE TO PROVIDE ACCESS TO CABLE VITAL PRODUCT DATA, filed on May 4, 2006, which application is incorporated herein by reference in its entirety.

TECHNICAL FIELD

The present invention relates generally to serial attached SCSI (SAS) storage domains and, in particular, to adjusting signal compensation parameters, including data rate, of data being transmitted through smart cables in SAS storage domains.

BACKGROUND ART

A serial attached SCSI (SAS) storage domain may include a central SAS switch. The domain may also include a redundant pair of SAS RAID controllers attached to the switch with cables and one or more SAS expanders, housing storage devices, also attached to the switch with cables, either directly or in a tree or daisy chain topology through other, upstream SAS expanders. The storage domain may then be partitioned into sub-domains, each comprising, for example, one first tier SAS expander directly attached to the switch with a cable. A sub-domain may also include one or more downstream second tier SAS expanders attached with a cable to the first tier SAS expander and/or one or more third tier SAS expanders attached with a cable to a second tier SAS expander. Thus, the topology of each sub-domain may resemble a tree or daisy chain.

It will be appreciated that the SAS devices in a storage domain (RAID controllers and SAS expanders) may be located at different distances from the SAS switch due to the physical layout of the data facility. Consequently, cables of different lengths are required for connection to the switch and to each other (in a sub-domain). Previously, with transmission of data at relatively low data rates, such as 1.5 Gb/sec., special conditioning may not have been required. However, as data rates continue to rise, such as to 3, 6 and eventually 12 Gb/sec., signal conditioning becomes important, particularly when the distance between devices, and hence cable lengths, increases. For a given cable length; the data rate should not exceed an established rate. Put a different way, for a given data rate, the cable length should not exceed an established length. For example, the length of SAS copper cable at a data rate of 3 Gb/sec. should not exceed 10 meters. And, it is expected that the length of SAS copper cable at a data rate of 6 Gb/sec. should not exceed 5 meters.

Some newer cables include non-volatile storage (NVS) storing cable vital product data (VPD) which can be read by an appropriate interface. Commonly-assigned and co-pending U.S. application Ser. No. 11/381,680, entitled MULTIPLEXING A GROUND SIGNAL ON A HIGH SPEED CABLE INTERFACE TO PROVIDE ACCESS TO CABLE VITAL PRODUCT DATA, filed on May 4, 2006, discloses such an interface.

New apparatus, methods and computer instructions are thus desirable to be able to take full advantage of the information provided by cable persistent data, including cable length, and to be able to adjust signal conditioning parameters accordingly.

SUMMARY OF THE INVENTION

The present invention provides a data storage domain, comprising a serial attached SCSI (SAS) switch, a first SAS expander comprising one or more SAS interfaces and a first smart cable attached between the first SAS interface and the second SAS interface. The SAS switch comprises one or more SAS interfaces, including a first SAS interface operable at least at a first data rate, and the first SAS expander comprises one or more SAS interfaces, including a second SAS interface operable at least at the first data rate. The first smart cable includes a non-volatile memory storing cable persistent data information that relates to the signal degradation characteristics of the first smart cable.

The first SAS expander further comprises a processor programmed to interrogate the first smart cable and any other smart cable attached between the first SAS expander and another SAS device in the data storage domain, the interrogation comprising a request for the cable persistent data of each attached smart cable, and capture in a table the cable persistent data of each attached smart cable. The SAS switch further comprises a processor programmed to direct that the one or more interfaces of the SAS switch and of the first SAS expander operate at the first data rate and collect the cable persistent data captured in the table. In response to the collected cable persistent data, the second processor is further programmed to determine a set of signal conditioning parameters for data being transmitted on each attached smart cable, the set of signal conditioning parameters including a maximum data rate and to transmit a command to the first processor to set the signal conditioning parameters for each attached smart cable in accordance with the set of determined signal conditioning parameters.

The present invention further includes a method, and a computer program product of a computer readable medium usable with a programmable computer and having computer-readable code embodied therein, for adjusting signal compensation parameters for transmission of data between a serial attached SCSI (SAS) switch and one or more SAS expanders in a data storage domain through smart cables.

DETAILED DESCRIPTION OF THE PREFERRED EMBODIMENT

Figure 1:
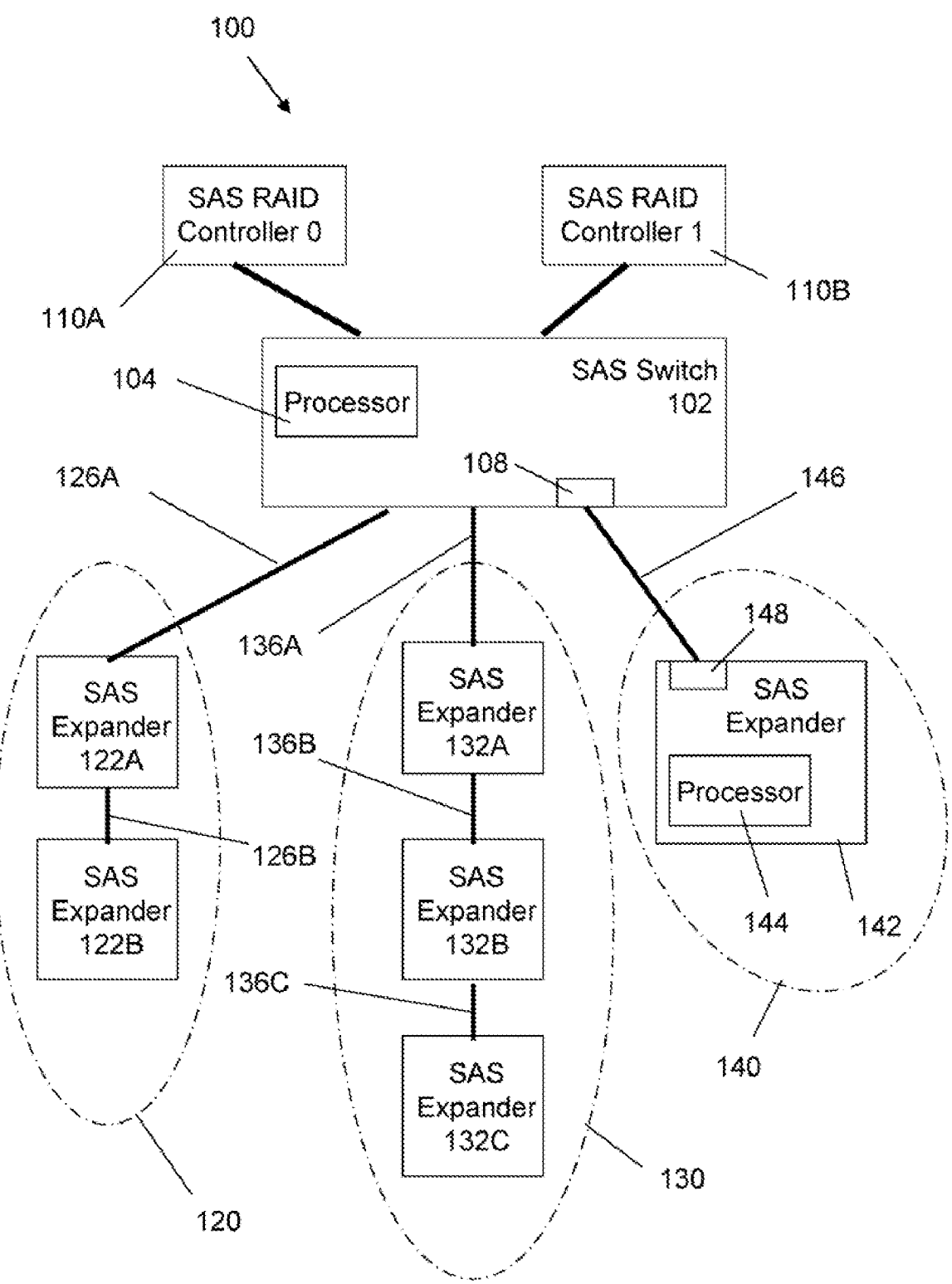
FIG. 1 is a block diagram of a data storage domain in which the present invention may be implemented.

FIG. 1 is a block diagram of a data storage domain 100 in which the present invention may be implemented. The domain 100 includes an SAS switch 102 (while a domain may preferably include a pair of redundant SAS switches, the pair will be illustrated as a single block 102 for clarity and be referred to herein in the singular). The switch 102 also includes a processor 104 programmed to execute instructions in accordance with the present invention. Attached to the switch 102 through appropriate interfaces is a redundant pair of RAID controllers 110A, 110B.

Also attached to the switch 102 are one or more SAS expanders 122A, 122B, 132A, 132B, 132C, 142 which house data storage drives. Each expander 122A, 122B, 132A, 132B, 132C, 142 includes a processor. For purposes of the illustration a processor 144 is shown associated with only one representative expander 142A, however, it will be understood that the other expanders 122A, 122B, 132A, 132B, 132C, include a processor as well. An expander may be attached to or interconnected with the switch 102 directly or may be attached to an "upstream" or higher tier expander. In the example illustrated in FIG. 1, the expanders are configured in a multi-branch "tree" arrangement: three top tier expanders 122A, 132A, 142 are attached to the switch 102, two second tier expanders 122B, 132B are attached to top tier expanders 122A, 132A, respectively, and a third tier expander 132C is attached to a second tier expander 132B. It will be appreciated that other configurations of the expanders may be used and that any "branch" may include one or more tiers with one or more expander at each tier.

Figure 2:
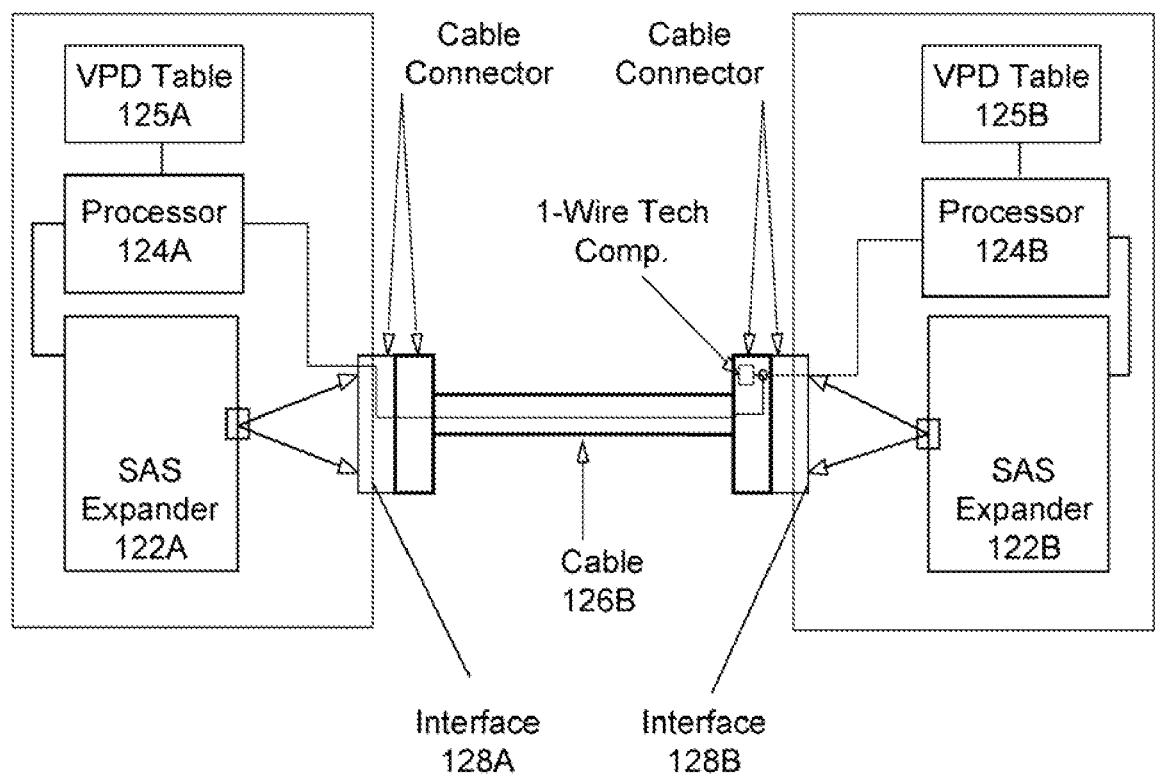
FIG. 2 is a block diagram of a smart cable interconnected between two SAS interfaces.

The expanders 122A, 122B, 132A, 132B, 132C, 142 are attached to the switch 102 or to higher tier expanders with cables 126A, 126B, 136A, 136B, 136C, 146. In accordance with the present invention, one or more of the cables 126A, 126B, 136A, 136B, 136C, 146 is a "smart" cable (it will be assumed for purposes of this application that all of the cables 126A, 126B, 136A, 136B, 136C, 146 are smart cables although that need not be the case). A smart cable is one which includes non-volatile storage (NVS) storing cable persistent data information that relates to the signal degradation characteristics and other characteristics. A special interface is used to read the cable persistent data. In FIG. 1, the cable 146 attaching one of the top tier expanders 142 to the switch 102 is interconnected to two such interfaces 108 (at the switch end) and 148 (at the expander end). Again, for clarity, only two representative interfaces 108, 148 are shown in the FIG.; however, it will be understood that each other cable 126A, 126B, 136A, 136B, 136C is connected at both ends to such interfaces. FIG. 2 illustrates the interconnection of two expanders 122A, 122B through the cable 126B connected to SAS interfaces 128A, 128B at each end. The aforementioned patent application Ser. No. 11/381,680, incorporated herein by reference, discloses additional details by which cable persistent data is read by the expanders 122A, 122B.

The storage domain 100 may be partitioned into sub-domains in FIG. 1, a first sub-domain 120 includes two expanders 122A, 122B; a second sub-domain 130 includes three expanders 132A, 132B, 132C; and a third sub-domain 140 includes a single expander 142.

Figure 3:
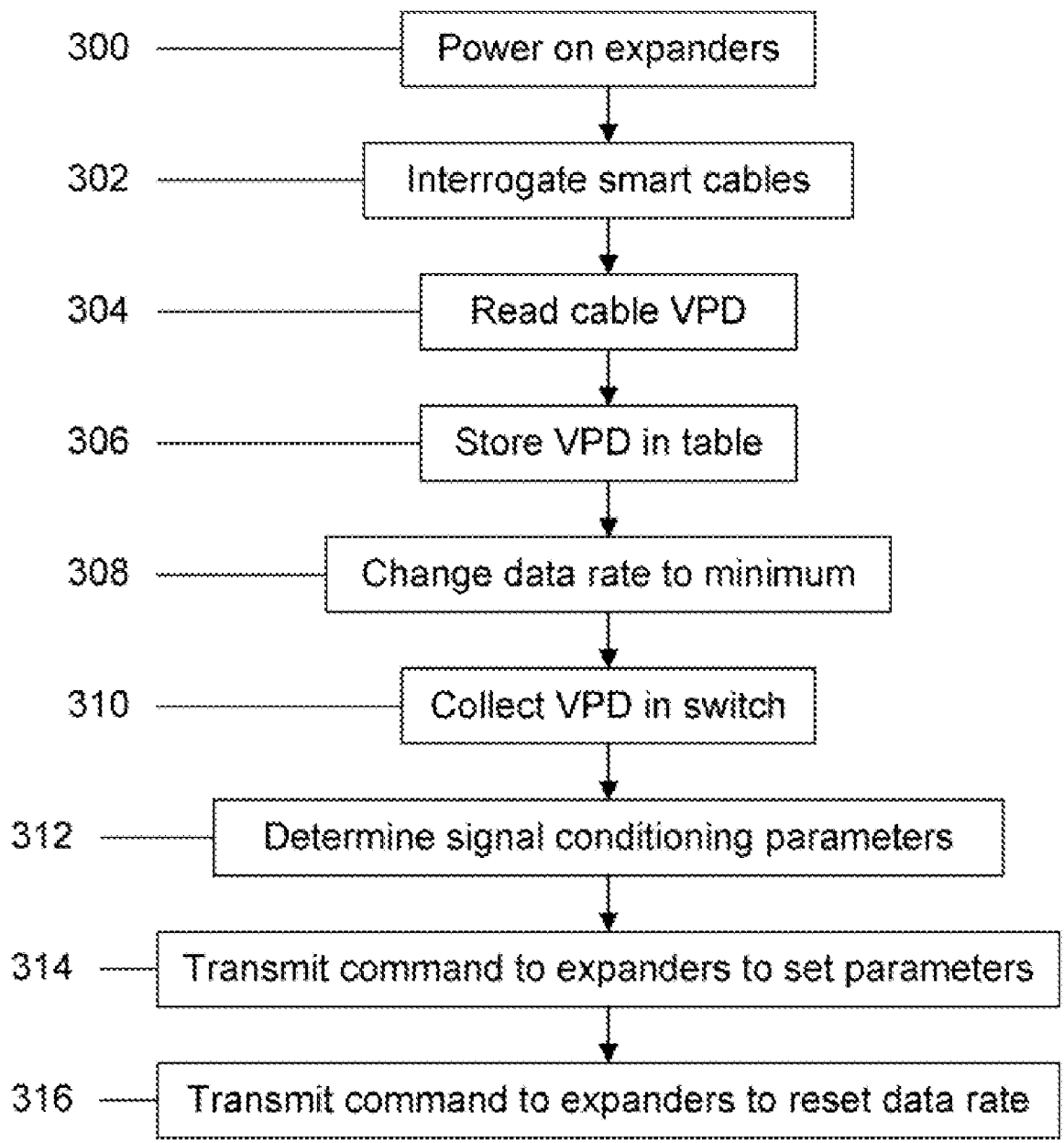
FIG. 3 is a flowchart illustrating the logic which may be used to control the data storage domain of the present invention.

Referring to the flowchart of FIG. 3, in operation, when the devices in the domain 100 are powered on, reset or subject to a comparable event (step 300), the processor in each expander 122A, 122B, 132A, 132B, 132C, 142 and in the switch 102 interrogate any attached smart cables (step 302). Cable persistent data is then read by the interrogating expander (step 304) and stored in a table (step 306), such as the representative tables 125A, 125B associated with expanders 122A, 122B (FIG. 2). Of particular relevance to the present invention are the signal degradation characteristics of the cable which may be expressed in attributes of the cable, one such attribute is the length of the cable, is stored in the cable persistent data.

Next, the processor 104 in the switch 102 transmits a command forcing all SAS interfaces 108, 148, 128A, 128B (along with the interfaces which are not shown) to operate at the lowest possible data rate, such as 1.5 Gb/sec. (step 308). Thus, all expanders 122A, 122B, 132A, 132B, 132C, 142 will be able to communicate with each other and with the switch 102 even without any signal conditioning. The processor 104 in the switch 102 then uses vendor-unique SMP commands to collect the cable persistent data stored in the tables 125A, 125B (step 310). The processor 104 uses the collected VPD to determine an appropriate set of signal conditioning parameter values for each cable interface (step 312). Importantly each set of parameter values is determined independent of each other set, The processor 104 then sends a set of parameter values to the respective expander 122A, 122B, 132A, 132B, 132C, 142 (step 314) and then a command for each expander 122A, 122B, 132A, 132B, 132C, 142 to adjust the conditioning parameter values of its associated interface(s), including the interface data rate, in accordance with the received set of values (step 316). The domain 100 is thereby tuned for optimum signal transmission based on the specific cable lengths between any of the devices. In accordance with the present invention, tuning for the "optimum" signal transmission does not necessarily require tuning for the maximum data rate. The switch 102 may override a maximum rate stored in a cable persistent data such that a particular cable interface is tuned to a slower rate. Moreover, a customer may locate the expanders 122A, 122B, 132A, 132B, 132C, 142 in a facility at various distances from the switch 102 or from each other and the present invention will automatically adjust the individual data rates of each cable interface based upon the lengths of cable used to connect the devices.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk driver a RAM, and CD-ROMs and transmission-type media such as digital and analog communication links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for adjusting signal compensation parameters or a method for deploying computing infrastructure comprising integrating computer readable code into a computing system for adjusting signal compensation parameters.

What is claimed is:

1. A data storage domain, comprising:
   a serial attached SCSI (SAS) switch comprising one or more SAS interfaces, including a first SAS interface operable at least at a first data rate;
   a first SAS expander comprising one or more SAS interfaces; including a second SAS interface operable at least at the first data rate;

a first smart cable attached between the first SAS interface and the second SAS interface and having a non-volatile memory storing persistent cable data including information relating to the signal degradation characteristics of the first smart cable;

the first SAS expander further comprising a first processor programmed to:
  interrogate the first smart cable and any other smart cable attached between the first SAS expander and another SAS device in the data storage domain, the interrogation comprising a request for the cable persistent data of each attached smart cable; and
  capture in a table the cable persistent data of each attached smart cable;

the SAS switch further comprising a second processor programmed to:
  direct that the one or more interfaces of the SAS switch and of the first SAS expander operate at the first data rate;
  collect the cable persistent data captured in the table;
  in response to the collected cable persistent data, determine a set of signal conditioning parameters for data being transmitted on each attached smart cable, the set of signal conditioning parameters including a maximum data rate; and
  transmit a command to the first processor to set the signal conditioning parameters for each attached smart cable in accordance with the set of determined signal conditioning parameters.

2. The data storage domain of claim 1, wherein the set of determined signal conditioning parameters includes a maximum data rate.

3. The data storage domain of claim 1, further comprising:
a second SAS expander having one or more SAS interfaces including a third SAS interface operable at least at the first data rate; and
a second smart cable attached between the first SAS interface and the third SAS interface and having a non-volatile memory storing cable persistent data information relating to the signal degradation characteristics of the smart cable.

4. The data storage domain of claim 1, further comprising:
a second SAS expander having one or more SAS interfaces, including a third SAS interface operable at least at the first data rate; and
a second smart cable attached between the second SAS interface and the third SAS interface and having a non-volatile memory storing cable persistent data information relating to the signal degradation characteristics of the smart cable.

5. The data storage domain of claim 1, further comprising:
a first sub-domain having a tree topology and comprising:
  the first SAS expander, the second SAS interface of the first expander operable up to a second data rate;
  the first smart cable;
  a second SAS expander comprising one or more SAS interfaces, including a third SAS interface operable at least at the first data rate and up to a third data rate; and
  a second smart cable attached between the second SAS interface of the first expander and third SAS interface of the second SAS expander and having a non-volatile memory storing cable persistent data including a length of the second smart cable; and
  the first processor further programmed to:
    interrogate the second smart cable attached between the first SAS expander and the second SAS expander, the interrogation comprising a request for the cable persistent data of the second smart cable; and
    capture in a table the cable persistent data of the second smart cable;
a second sub-domain having a tree topology and comprising:
  a third SAS expander comprising one or more SAS interfaces, including a fourth SAS interface operable at least at the first data rate and up to a fourth data rate; and
  a third smart cable attached between the SAS switch and the fourth SAS interface and having a non-volatile memory storing cable persistent data including a length of the third smart cable;
  the third SAS expander further comprising a third processor programmed to:
    interrogate the third smart cable attached between the SAS switch and the third SAS expander, the interrogation comprising a request for the cable persistent data of third smart cable; and
    capture in a table the cable persistent data of the third smart cable;
the second processor being programmed to:
  in response to the collected cable persistent data, determine a first set of signal conditioning parameters for data being transmitted on the second attached smart cable, the first set of signal conditioning parameters including the second data rate;
  in response to the collected cable persistent data, determine a second set of signal conditioning parameters for data being transmitted on the third attached smart cable, the second set of signal conditioning parameters including the third data rate;
  transmit a command to the first processor to set the signal conditioning parameters for the second smart cable in accordance with the first set of determined signal conditioning parameters; and
  transmit a command to the third processor to set the signal conditioning parameters for the third smart cable in accordance with the second set of determined signal conditioning parameters.

6. The data storage domain of claim 5, wherein the second data rate is different from the third data rate.

7. A method for adjusting signal compensation parameters for transmission of data between a serial attached SCSI (SAS) switch and one or more SAS expanders in a data storage domain through smart cables having a non-volatile memory storing cable persistent data information relating to the signal degradation characteristics of the smart cable, each SAS expander having one or more SAS interfaces operable at least at a first data rate, the method comprising:
  directing that a first SAS expander interrogate any attached smart cables for the cable persistent data of each attached smart cable;
  capturing in a table the cable persistent data of each smart cable attached to the first SAS expander;
  operating the one or more interfaces of the first SAS expander at the first data rate;
  collecting the captured cable persistent data in the SAS switch;
  in response to the collected cable persistent data, determining a set of signal conditioning parameters for data being transmitted on each attached smart cable, the set of signal conditioning parameters including a first maximum data rate; and setting the signal conditioning parameters for each attached smart cable in accordance with the set of determined signal conditioning parameters, whereby the data storage domain is tuned for optimum signal transmission.

8. The method of claim 7, wherein each set of determined signal conditioning parameters includes a maximum data rate.

9. The method of claim 7, wherein the data storage domain includes a plurality of sub-domains having a tree topology, each sub-domain including at least one SAS expander, a first sub-domain including the first SAS expander and a second sub-domain including a second SAS expander the method further comprising:
- interrogating any smart cable attached to the second SAS expander, the interrogation comprising a request for the cable persistent data of any attached smart cable;
- capturing in a table the cable persistent data of any smart cable attached to the second SAS expander;
- collecting the captured cable persistent data from the table in the second SAS expander;
- in response to the collected cable persistent data from the second SAS expander, determining a second set of signal conditioning parameters for data being transmitted on any smart cable attached to the second SAS expander the second set of signal conditioning parameters including a second maximum data rate; and
- setting the signal conditioning parameters for each smart cable attached to the second SAS expander in accordance with the second set of determined signal conditioning parameters.

10. The method of claim 9, wherein the first maximum data rate is different from the second maximum data rate.

11. The method of claim 7, wherein at least one set of determined signal conditioning parameters includes a data rate less than the maximum data rate whereby the data storage domain is tuned for optimum signal transmission.

12. A computer program product of a computer readable medium usable with a programmable computer, the computer program product having computer-readable code embodied therein for adjusting signal compensation parameters for transmission of data between a serial attached SCSI (SAS) switch and one or more SAS expanders in a data storage domain through smart cables having a non-volatile memory storing cable persistent data information relating to the signal degradation characteristics of the smart cable, each SAS expander having one or more SAS interfaces operable at least at a first data rate, the computer-readable code comprising instructions for:
- directing that a first SAS expander interrogate any attached smart cables for the cable persistent data of each attached smart cable;
- capturing in a table the cable persistent data of each smart cable attached to the first SAS expander;
- operating the one or more interfaces of the first SAS expander at the first data rate;
- collecting the captured cable persistent data in the SAS switch;
- in response to the collected cable persistent data, determining a set of signal conditioning parameters for data being transmitted on each attached smart cable, the set of signal conditioning parameters including a first maximum data rate; and
- setting the signal conditioning parameters for each attached smart cable in accordance with the set of determined signal conditioning parameters, whereby the data storage domain is tuned for optimum signal transmission.

13. The computer program product of claim 12, wherein each set of determined signal conditioning parameters includes a maximum data rate.

14. The computer program product of claim 12 wherein the data storage domain includes a plurality of sub-domains having a tree topology, each sub-domain including at least one SAS expander, a first sub-domain including the first SAS expander and a second sub-domain including a second SAS expander, the computer-readable code further comprising instructions for:
- interrogating any smart cable attached to the second SAS expander, the interrogation comprising a request for the cable persistent data of any attached smart cable;
- capturing in a table the cable persistent data of any smart cable attached to the second SAS expander;
- collecting the captured cable persistent data from the table in the second SAS expander;
- in response to the collected cable persistent data from the second SAS expander, determining a second set of signal conditioning parameters for data being transmitted on any smart cable attached to the second SAS expander the second set of signal conditioning parameters including a second maximum data rate; and
- setting the signal conditioning parameters for each smart cable attached to the second SAS expander in accordance with the second set of determined signal conditioning parameters.

15. The computer program product of claim 14 wherein the first maximum data rate is different from the second maximum data rate.

16. The computer program product of claim 12, wherein at least one set of determined signal conditioning parameters includes a data rate less than the maximum data rate whereby the data storage domain is tuned for optimum signal transmission.

* * * * *